US007803860B2

(12) United States Patent
Smedberg et al.

(10) Patent No.: US 7,803,860 B2
(45) Date of Patent: Sep. 28, 2010

(54) POLYMER COMPOSITIONS HAVING IMPROVED WET AGEING PROPERTIES

(75) Inventors: Annika Smedberg, Myggenaes (SE); Perry Nylander, Goeteborg (SE); Detlef Wald, Antwerp (BE); Nigel Hampton, Forest Park, GA (US)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/916,880

(22) PCT Filed: Jun. 1, 2006

(86) PCT No.: PCT/EP2006/005246

§ 371 (c)(1),
(2), (4) Date: May 28, 2008

(87) PCT Pub. No.: WO2006/131264

PCT Pub. Date: Dec. 14, 2006

(65) Prior Publication Data

US 2009/0227716 A1    Sep. 10, 2009

(30) Foreign Application Priority Data

Jun. 8, 2005    (EP) ................... 05012352

(51) Int. Cl.
*C08K 5/103*    (2006.01)
(52) U.S. Cl. ...................... 524/313; 524/312
(58) Field of Classification Search ............. 524/312, 524/313
See application file for complete search history.

(56) References Cited

U.S. PATENT DOCUMENTS

| 3,717,601 | A | * | 2/1973 | Jurrens ................ 524/271 |
| 4,305,849 | A | | 12/1981 | Kawasaki et al. |
| 4,504,434 | A | * | 3/1985 | Cooper ................ 264/222 |
| 4,812,505 | A | | 3/1989 | Topcik |
| 5,414,030 | A | * | 5/1995 | Kotani et al. ............ 524/99 |
| 5,539,075 | A | | 7/1996 | Gustafsson et al. |
| 6,165,573 | A | * | 12/2000 | Hirose et al. ........... 428/36.6 |
| 7,595,421 | B2 | * | 9/2009 | Grass et al. ............ 560/180 |
| 2005/0059757 | A1 | * | 3/2005 | Bredt et al. ............... 524/3 |

FOREIGN PATENT DOCUMENTS

| EP | 0688794 | 12/1995 |
| EP | 0949274 | 10/1999 |
| WO | 8505216 | 11/1985 |
| WO | 9212182 | 7/1992 |
| WO | 9308222 | 4/1993 |
| WO | 9413707 | 6/1994 |
| WO | 9512622 | 5/1995 |
| WO | 9931675 | 6/1999 |
| WO | 0034341 | 6/2000 |

* cited by examiner

*Primary Examiner*—Peter Szekely
(74) *Attorney, Agent, or Firm*—Roberts Mlotkowski Safran & Cole, P.C.

(57) ABSTRACT

The present invention relates to a crosslinkable polymer composition, comprising (i) a polyolefin, (ii) a polar copolymer, and (iii) a glycerol ester compound.

29 Claims, No Drawings

POLYMER COMPOSITIONS HAVING IMPROVED WET AGEING PROPERTIES

The present invention relates to a polymer composition with improved wet ageing properties, especially improved water tree resistance properties, and improved crosslinking properties as well as improved processability, and a multi-layered article such as a power cable comprising the polymer composition.

A typical electric power cable generally comprises one or more conductors in a cable core that is surrounded by several layers of polymeric materials including an inner semiconducting layer, followed by an insulating layer, and then an outer semiconducting layer. These layers are normally crosslinked. To these layers, further layers may be added, such as a metallic tape or wire shield, and finally a jacketing layer. The layers of the cable are based on different types of polymers. Nowadays, low density polyethylene, crosslinked by adding peroxide compounds, is the predominant cable insulation material.

A limitation of polyolefins is their tendency to be exposed, in the presence of water and under the action of strong electric fields, to the formation of bush-shaped defects, so-called water trees, which can lead to lower breakdown strength and possibly electric failure. This tendency is strongly affected by the presence of inhomogeneities, microcavities and impurities in the material. Water treeing is a phenomenon that has been studied carefully since the 1970's.

In electrically strained polymer materials, subjected to the presence of water, processes can occur which are characterized as "water treeing". It is known that insulated cables suffer from shortened service life when installed in an environment where the polymer is exposed to water, e.g. under ground or at locations of high humidity.

The appearances of water tree structures are manifold. In principle, it is possible to differentiate between two types:
"Vented trees" which have their starting point on the surface of the material extending into the insulation material and
"Bow-tie trees" which are formed within the insulation material.

The water tree structure constitutes local damage leading to reduced dielectric strength.

Common polymeric materials for wire and cable applications are preferably made from polyethylene homopolymers, ethylene-propylene-elastomers, otherwise known as ethylene-propylene-rubber (EPR), or polypropylene.

Polyethylene is generally used without a filler as an electrical insulation material as it has good dielectric properties, especially high breakdown strength and low power factor. However, polyethylene homopolymers are prone to "water-treeing" in the presence of water.

Many solutions have been proposed for increasing the resistance of insulating materials to degradation by water-treeing. One solution involves the addition of polyethylene glycol, as water-tree growth inhibitor to a low density polyethylene such as described in U.S. Pat. Nos. 4,305,849 and 4,812,505. Furthermore, the invention WO 99/31675 discloses a combination of specific glycerol fatty acid esters and polyethylene glycols as additives to polyethylene for improving water-tree resistance. Another solution is presented in WO 85/05216 which describes copolymer blends. The ethylene polymers do not have any significant amounts of carbon-carbon double bonds.

Moreover, the compositions used most in this technical field are crosslinked. Crosslinking can be effected by adding free-radical forming agents like peroxides to the polymeric material prior to or during extrusion, for example cable extrusion. The free-radical forming agent should preferably remain stable during extrusion, performed at a temperature low enough to minimize the early decomposition of the peroxide but high enough to obtain proper melting and homogenisation. Furthermore, the crosslinking agent should decompose in a subsequent crosslinking step at elevated temperature. If e.g. a significant amount of peroxide already decomposes in the extruder, thereby initiating premature crosslinking, this will result in the formation of so-called "scorch", i.e. inhomogeneity, surface unevenness and possibly discolouration in the different layers of the resultant cable. Thus, any significant decomposition of free-radical forming agents during extrusion should be avoided. On the other hand, thermal treatment at the elevated temperature of the extruded polyolefin layer should result in high crosslinking speed and high crosslinking efficiency.

Despite the compositions according to the prior art and the resistance to water-treeing that they afford, a solution that could combine water-tree retardancy in combination with high productivity is needed. The limitations today are partly due to the processing characteristics and the curing kinetics. Solutions that could enable longer running times, crosslink faster or that could be crosslinked under milder crosslinking conditions would all lead to a higher productivity at the cable manufacturing step. However, increased productivity must not be reached on the expense of resistance to water treeing. The expected life time of an installed cable is more than 30 years. If a cable has an electrical breakdown the affected part of the cable has to be replaced. The costs of the cable are low compared to costs arising by a repair of the damaged part of the cable. Therefore it is of interest to find solutions that offer better water treeing properties that then prolong the service life of the cable if it is exposed to wet or humid environments.

The object of the present invention is therefore to provide a new polymer composition that offers a combination of increased productivity through enhanced crosslinking properties in combination with improved water-tree resistance, optionally in combination with improved processing characteristics.

Another object is to reduce the formation of scorch.

These objects are solved by providing a crosslinkable polymer composition comprising
(i) a polyolefin,
(ii) a polar copolymer, and
(iii) a glycerol ester compound.

As will be explained below, the polymeric components (i) and (ii) differ in at least one property, e.g. the amount of polar comonomer units which are present within the polymer.

Component (i)

Preferably, the polyolefin can be each polyolefin which is suitable as an insulating or semiconductive layer of an electric cable. The choice and the composition of the polyolefin varies, depending on whether the composition is intended as an insulating layer of an electric cable or as an inner or outer semiconducting layer of an electric cable. Preferably, a polyethylene homopolymer and/or a polyethylene copolymer is used. Thus, the polyolefin may be composed of polyethylene homopolymer and/or copolymers of ethylene, wherein the copolymers may be grafted copolymers and/or may be polymers of ethylene and one or more comonomers which are copolymerizable with ethylene. Suitable comonomers are for instance alkyl $C_3$ to $C_{20}$ α-olefins. Preferred examples for the $C_3$ to $C_{20}$ alkyl α-olefins are propylene, 1-butene, 4-methyl-1-pentene, 1-hexene and 1-octene.

Preferably, the polyolefin comprises units derived from polar comonomers, optionally in combination with units derived from the $C_3$-$C_{20}$ comonomer(s). Preferably, as polar monomer units, compounds containing hydroxyl groups, alkoxy groups, carbonyl groups, carboxyl and ester groups are used.

Still more preferably, the polar comonomer units are selected from the group of alkyl acrylates, alkyl methacrylates, and vinyl acetates. Further preferred, the polar comonomers are selected from $C_1$-to $C_6$-alkyl acrylates, $C_1$-to $C_6$-alkyl methacrylates, and vinyl acetate. Still more preferably, the polar comonomers are selected from $C_1$-to $C_4$-alkyl acrylates, such as methyl, ethyl, propyl or butyl acrylate.

For example, polar monomer units may be selected from the group of alkylesters of (meth)acrylic acid, such as methyl, ethyl and butyl(meth)acrylate and vinylacetate. The acrylate type of polar comonomer is preferred over acetates due to their better resistance to thermal degradation at high temperature.

Preferably, the polyolefin has an amount of units derived from the polar comonomer of less than 150 micromoles, more preferably less than 125 micromoles, even more preferably less than 100 micromoles, even more preferably less than 85 micromoles and most preferably less than 70 micromoles per gram of polyolefin.

In a preferred embodiment, the polyolefin is an ethylene homopolymer. The expression "ethylene homopolymer" as used herein refers to a polyethylene that consists substantially, i.e. to at least 99% by weight, even more preferably at least 99.5% by weight and most preferably at least 99.8% by weight of the ethylene.

Preferably, the polyolefin is polymerized in a high pressure reactor, either in an autoclave or a tubular reactor, at a pressure between 1200 to 3500 bars and at a temperature between 150 to 350° C.

It falls also in the scope of this invention that the polyolefin, preferably a polyethylene homopolymer and/or polyethylene copolymer, is polymerized in a low pressure process. In that case, the polyolefin is preferably multimodal.

In a preferred embodiment, the polyethylene contains at least 60 wt-% ethylene monomer units. In other preferred embodiments, the polyethylene contains at least 70 wt-%, at least 80 wt-% or at least 90 wt-% ethylene monomer units.

The expression "modality of a polymer" refers to the form of its molecular weight distribution (MWD) curve, i.e. the appearance of the graph of the polymer weight fraction as a function of its molecular weight. If the polymer is produced via mechanical blending of the components or in a sequential step process, i.e. by utilizing reactors coupled in series and using different conditions in each reactor, the different polymer fractions blended or produced in the different reactors will each have their own molecular weight distribution which may considerably differ from one another.

The molecular weight distribution curve of the resulting final polymer can be looked at as the superposition of the molecular weight distribution curves of the polymer components/fractions which will accordingly show two or more distinct maxima or at least distinctly broadened compared with the curves for the individual fractions. A polymer showing such a molecular weight distribution curve is called "bimodal" or "multimodal", respectively.

The blending or modality can also have effects on other types of distributions such as the composition distribution.

Multimodal polymers can be produced by blending (either by blending pellets or by blending the different components in the molten state) of the components or it can be produced directly in several types of processes, e.g. those described in WO 92/12182.

The multimodal polyolefin preferably is produced in a multistage process in a multistep reaction sequence such as described in WO 92/12182.

The catalyst for the production of the polyolefin, preferably polyethylene homopolymer or polyethylene copolymer, may be a chromium, a Ziegler-Natta or most preferably a single-site catalyst. Single-site catalysts are described in EP 688 794, EP 949 274, WO 95/12622 and WO 00/34341. Catalyst carriers shall be selected to minimize residues in the polymer.

In another preferred embodiment of the present invention, the polyolefin is an unsaturated polyolefin having a total amount of double bonds/1000 carbon atoms of at least 0.1. With regard to the polyolefin, the term "total amount of carbon-carbon double bonds" refers to those double bonds originating from vinyl groups, vinylidene groups and trans-vinylene groups. The amount of each type of double bond is measured as indicated in the experimental part.

The incorporation of the total amount of carbon-carbon double bonds according to the present invention within the polyolefin component enables to accomplish improved crosslinking properties.

In a preferred embodiment, the total amount of carbon-carbon double bonds is at least 0.15/1000 C-atoms. In other preferred embodiments, the total amount of carbon-carbon double bonds is at least 0.20, at least 0.25, at least 0.30, at least 0.35, more than 0.37, at least 0.40, at least 0.45, at least 0.50, at least 0.55, at least 0.60, at least 0.65, at least 0.70, at least 0.75 or at least 0.80/1000 C-atoms.

The total amount of vinyl groups is preferably at least 0.04/1000 carbon atoms. In other preferred embodiments, it is at least 0.08, at least 0.10, at least 0.15, at least 0.20, at least 0.25, at least 0.30, at least 0.35, at least 0.40, at least 0.45, at least 0.50, at least 0.55, at least 0.60, at least 0.65, at least 0.70, at least 0.75 or at least 0.80 vinyl groups/1000 carbon atoms. Of course, since a vinyl group is a specific type of carbon-carbon double bond, the total amount of vinyl groups for a given unsaturated polyolefin does not exceed its total amount of double bonds.

Two types of vinyl groups can be differentiated. One type of vinyl group is generated by the polymerisation process (e.g. via a β-scission reaction of a secondary radical) or results from the use of chain transfer agents introducing vinyl groups. Another type of vinyl group may originate from a polyunsaturated comonomer used for the preparation of the unsaturated polyolefin, as will be described later in greater detail.

Preferably, the amount of vinyl groups originating from the polyunsaturated comonomer is at least 0.03/1000 carbon atoms. In other preferred embodiments, the amount of vinyl groups originating from the polyunsaturated comonomer is at 0.06, at least 0.09, at least 0.12, at least 0.15, at least 0.18, at least 0.21, at least 0.25, at least 0.30, at least 0.35 or at least 0.40/1000 carbon atoms.

In addition to the vinyl groups originating from the polyunsaturated comonomer, the total amount of vinyl groups may further comprise vinyl groups originating from a chain transfer agent which introduces vinyl groups, such as propylene.

Preferred unsaturated polyolefins of the present invention such as unsaturated polyethylene may have densities higher than 0.860, 0.880, 0.900, 0.910, 0.915, 0.917, or 0.920 g/cm³.

Preferred unsaturated polyolefins of the present invention such as unsaturated polyethylene may have densities not higher than 0.930, 0.935, 0.940, 0.945, 0.950, 0.955, or 0.960 g/cm³.

The polyolefin can be unimodal or multimodal, e.g. bimodal.

In the present invention, the unsaturated polyolefin is preferably an unsaturated polyethylene or an unsaturated polypropylene. Most preferably, the unsaturated polyolefin is an unsaturated polyethylene. Unsaturated polyethylene of low density is preferred. In a preferred embodiment, the unsaturated polyethylene contains at least 60 wt-% ethylene monomer units. In other preferred embodiments, the unsaturated polyethylene contains at least 70 wt-%, at least 80 wt-% or at least 90 wt-% ethylene monomer units.

Preferably, the unsaturated polyolefin is prepared by copolymerising at least one olefin monomer with at least one polyunsaturated comonomer. In a preferred embodiment, the polyunsaturated comonomer consists of a straight carbon chain with at least 8 carbon atoms and at least 4 carbon atoms between the non-conjugated double bonds, of which at least one is terminal.

Ethylene and propylene are preferred olefin monomers. Most preferably, ethylene is used as the olefin monomer. As a comonomer, a diene compound is preferred, e.g. 1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof can be mentioned.

Siloxanes having the following formula:

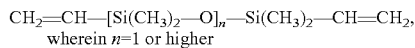

wherein $n=1$ or higher can also be used as a polyunsaturated comonomer. As an example, divinylsiloxanes, e.g. α,ω-divinylsiloxane, can be mentioned.

In addition to the polyunsaturated comonomer, further comonomers can optionally be used. Such optional comonomers can be selected from $C_3$-$C_{20}$ alpha-olefins such as propylene, 1-butene, 1-hexene and 1-nonene.

As already indicated above, it is also possible to use polar comonomers, optionally in combination with the $C_3$-$C_{20}$ comonomer(s). As polar comonomer units for the unsaturated polyolefin, those can be mentioned which have already been listed above. Furthermore, the amount of polar comonomer units within the unsaturated polyolefin corresponds to the amount already mentioned above when discussing the polyolefin in more general terms.

The unsaturated polyolefin can be produced by any conventional polymerisation process. Preferably, it is produced by radical polymerisation, such as high pressure radical polymerisation. High pressure polymerisation can be effected in a tubular reactor or an autoclave reactor. Preferably, it is a tubular reactor. Further details about high pressure radical polymerisation are given in WO93/08222, which is herewith incorporated by reference. However, the unsaturated polyolefin can also be prepared by other types of polymerisation process such as coordination polymerisation, e.g. in a low pressure process using any type of supported and non-supported polymerization catalyst. As an example, multi-site including dual site and single site catalyst systems such as Ziegler-Natta, chromium, metallocenes of transition metal compounds, non-metallocenes of late transition metals, said transition and later transition metal compounds belonging to group 3-10 of the periodic table (IUPAC 1989). The coordination polymerization processes and the mentioned catalysts are well-known in the field and may be commercially available or produced according to known literature.

When preparing the unsaturated polyolefin such as an unsaturated polyethylene in a high pressure process, the polymerisation is generally performed at a pressure in the range of 1200 to 3500 bar and a temperature in the range of 150 to 350° C.

Component (ii)

The crosslinkable polymer composition of the present invention further comprises a polar copolymer.

Within the context of the present invention, a polar copolymer is defined to be any copolymer having units derived from a polar comonomer. Further in the context of the present invention, the term 'total amount of carbon-carbon double bonds' for the polar copolymer (Component (ii)) refers to those double bonds originating from vinyl groups and vinylidene groups. The amount of each type of double bond is measured as indicated in the experimental part. The incorporation of the total amount of carbon-carbon double bonds according to the present invention enables to accomplish for the improved crosslinking properties.

Preferably, as a polar comonomer, compounds containing hydroxyl groups, alkoxy groups, carbonyl groups, carboxyl groups, and ester groups, are used.

More preferably, compounds containing carboxyl and/or ester groups are used and still more preferably, the compound is selected from the groups of acrylates and acetates. The acrylate type of polar comonomer is preferred over acetates due to their better resistance to thermal degradation at high temperature.

Still more preferably, the polar comonomer is selected from the group of alkyl acrylates, alkyl methacrylates, and vinyl acetate. Further preferred, the comonomers are selected from $C_1$-to $C_6$-alkyl acrylates, $C_1$-to $C_6$-alkyl methacrylates, and vinyl acetate. Still more preferably, the polar copolymer comprises a copolymer of ethylene with $C_1$-to $C_4$-alkyl, such as methyl, ethyl, propyl or butyl acrylates or vinyl acetate.

For example, polar monomer units may be selected from the group of alkylesters of (meth)acrylic acid such as methyl, ethyl and butyl(meth)acrylate and vinylacetate. The acrylate type of polar comonomer is preferred over acetates due to their better resistance to thermal degradation at high temperatures.

Preferably, the polar copolymer is prepared by copolymerizing an olefin monomer and a polar comonomer.

In a preferred embodiment, the olefin monomer is selected from ethylene or $C_3$ to $C_{20}$ alpha-olefins such as propylene, 1-butene, 4-methyl-1-pentene, 1-hexene, 1-octene or 1-nonene, or mixtures thereof. Even more preferred, the olefin monomer is ethylene.

Preferably, the polar copolymer has an amount of units derived from the polar comonomer of more than 500 micromoles per gram of polar copolymer.

As discussed above, within the unsaturated polyolefin, the amount of units derived from a polar comonomer is preferably less than 150 micromoles per gram of unsaturated polyolefin. Thus, when providing a polar copolymer having an amount of units derived from a polar comonomer of preferably more than 500 micromoles per gram of polar copolymer, the polymeric components (i) and (ii) of the crosslinkable polymer composition differ in at least one property and are clearly distinguishable.

In other preferred embodiments, the polar copolymer has an amount of units derived from the polar comonomer of more than 700 micromoles, more than 900 micromoles, or more than 1100 micromoles per gram of polar copolymer.

In a preferred embodiment, the polar copolymer has a total amount of carbon-carbon double bonds (i.e. here the sum of vinyl and vinylidene) of at least 0.15/1000 C-atoms. In other preferred embodiments, the total amount of carbon-carbon double bonds is at least 0.20, at least 0.25, at least 0.30 or at least 0.35/1000 C-atoms.

The total amount of vinyl groups of the polar copolymer is preferably higher than 0.01/1000 carbon atoms. In other preferred embodiments, it is at least 0.05, at least 0.08, at least 0.10, at least 0.12, at least 0.15, at least 0.20, at least 0.25, at least 0.30, at least 0.35, at least 0.40 vinyl groups/1000 carbon atoms. Of course, since a vinyl group is a specific type of carbon-carbon double bond, the total amount of vinyl groups for a given unsaturated polyolefin does not exceed its total amount of double bonds.

Preferably, the amount of vinyl groups originating from the polyunsaturated comonomer is at least 0.03/1000 carbon atoms. In other preferred embodiments, the amount of vinyl groups originating from the polyunsaturated comonomer is at 0.06, at least 0.09, at least 0.12, at least 0.15, at least 0.18, at least 0.21, at least 0.25, at least 0.30, at least 0.35 or at least 0.40/1000 carbon atoms.

Within the context of the present invention, it is also possible to use a polar copolymer having vinylidene groups but substantially no vinyl groups, wherein the amount of carbon-carbon double bonds/1000 C-atoms originating from the vinylidene groups is at least 0.15, 0.20, 0.25, 0.30 or at least 0.35.

Preferably, the polar copolymer comprises units derived from a polyunsaturated comonomer. In a preferred embodiment, the polyunsaturated comonomer consists of a straight carbon chain with at least 8 carbon atoms and at least 4 carbon atoms between the non-conjugated double bonds, of which at least one is terminal.

As preferred polyunsaturated comonomers, the following dienes can be mentioned:

1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof.

Siloxanes having the following formula:

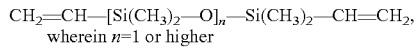
wherein $n=1$ or higher can also be used as a polyunsaturated comonomer. As a example, divinylsiloxane, e.g. α,ω-divinylsiloxane, can be mentioned.

In a preferred embodiment, the polar copolymer comprises units derived from an olefin comonomer. Preferably, the olefin comonomer is selected from ethylene, a $C_3$ to $C_{20}$ alpha-olefin such as propylene, 1-butene, 4-methyl-1-pentene, 1-hexene, 1-octene or 1-nonene, or mixtures thereof.

Preferably, the polar copolymer has a melt flow rate $MFR_{2.16/190° C.}$ in the range of 0.5 to 70 g/10 min, more preferably 1-55 g/10 min, even more preferably 1.5-40 g/10 min.

When the polar copolymer is prepared by copolymerizing an olefin such as ethylene with a polar comonomer, optionally in the presence of a poly-unsaturated comonomer and/or a $C_3$ to $C_{20}$ alpha-olefin comonomer, this is preferably effected in a high pressure process resulting in low density polyethylene or in a low pressure process in the presence of a catalyst, for example a chromium, Ziegler-Natta or single-site catalyst resulting in either unimodal or multimodal polyethylene.

The multimodal polymer is preferably produced either by mechanical blending of components or in a multi-stage process in a multi-step reaction sequence such as described in WO92/12182.

When preparing the polar ethylene copolymer in a high pressure process, polymerization is generally performed at a pressure of 1200 to 3500 bars and a temperature of 150 to 350° C.

Component (iii)

A further essential component of the crosslinkable polymer composition of the present invention is a glycerol ester compound. Within the context of the present invention, a glycerol ester compound is an ester obtained by esterification of glycerol or polyglycerol with at least one carboxylic acid.

In a preferred embodiment, the glycerol ester compound has a formula (I) of $$R^1O[C_3H_5(OR^2)O]_nR^3 \qquad (I)$$

where $n \geqq 1$, preferably $n=1$-25, $R^1$, $R^2$ and $R^3$ are the same or different, preferably designate hydrogen or the residue of a carboxylic acid with 8 to 24 carbon atoms in the molecule. The compound of the general formula (I) is a monomer or polyglycerol ester, where at least one OH group forms an ester with a carboxylic acid with 8 to 24 carbon atoms. Preferably the compound of formula (I) is a monoester, i.e. it contains one rest of a carboxylic acid with 8 to 24 carbon atoms per molecule. Further, the ester forming carboxylic acid, preferably forms the ester with a primary hydroxylic group of the glycerol compound. The compound of formula (I) may include 1 to 25, preferably 1 to 20, preferably 1 to 15, most preferably 3 to 8 glycerol units, i.e. n in the formula (I) is preferably 1 to 25, 1 to 20, 1 to 15 or 3 to 8.

When $R^1$, $R^2$ and $R^3$ in Formula (I) do not designate hydrogen, they designate the residue of a carboxylic acid with 8 to 24 carbon atoms. These carboxylic acids may be saturated or unsaturated and branched or unbranched. Non-limiting examples of such carboxylic acids are lauric acid, myristic acid, palmitic acid, stearic acid, oleic acid, linolenic acid and linoleic acid. When the carboxylic residue is unsaturated the unsaturation may be utilized for binding the compound of formula (I) to the polyolefin of the composition and thus effectively prevent migration of the compound from the composition. In formula (I), $R^1$, $R^2$, $R^3$ may designate the same carboxylic acid residue, such as stearoyl or different carboxylic acid residues such as stearoyl and oleoyl.

In a preferred embodiment, the components (i), (ii) and (iii) of the crosslinkable polymer composition of the present invention are prepared and/or provided separately and are subsequently blended with each other to result in a blend.

Crosslinkable Polymer Composition (The Blend)

Preferably, the glycerol ester compound is present in an amount of 0.05 to 2 wt %, based on the weight of the crosslinkable polymer composition.

Preferably, the crosslinkable polymer composition comprises an amount of 5 to 60 wt-%, more preferably, 8 to 50 wt %, even more preferably 10-40 wt-% and even more preferably 15-35 wt-% of polar copolymer, based on the weight of the crosslinkable polymer composition.

In a preferred embodiment, the crosslinkable polymer composition comprises a total amount of units derived from the polar comonomer of 100 to 800 micromoles, more preferably 150 to 700 micromoles and even more preferably 200 to 600 micromoles per gram of crosslinkable polymer composition. The total amount of polar comonomer units also includes those of the unsaturated polyolefin, if present.

Preferably, the crosslinkable polymer composition has a total amount of carbon-carbon double bonds/1000 carbon atoms of more than 0.05, more preferred more than 0.10, more than 0.15, more than 0.20, more than 0.25, more than 0.30, more than 0.35, more than 0.40, more than 0.45, more than 0.50, more than 0.55, or more than 0.60 carbon-carbon double bonds/1000 carbon atoms. The total amount of double bonds of the crosslinkable polymer composition is based on vinyl, vinylidene and trans-vinylene groups/1000 C-atoms of component (i) and, if present, on vinyl and vinylidene groups/1000 C-atoms of component (ii).

Furthermore, it is preferred that the crosslinkable polymer composition has a total amount of vinyl groups/1000 carbon atoms of more than 0.05. Again, the total amount of vinyl groups includes those of the polar copolymer, if present. In other preferred embodiments, the crosslinkable polymer composition has a total amount of vinyl groups/1000 carbon atoms of at least 0.10, at least 0.15, at least 0.20, at least 0.25, at least 0.30, at least 0.35, at least 0.40, or at least 0.45.

In a preferred embodiment, the crosslinkable polymer composition comprises a polyethylene glycol. Preferably, the polyethylene glycol has a number average molecular weight in the range of 1000 to 50000.

In a preferred embodiment, the crosslinkable polymer composition according to the present invention further comprises a crosslinking agent. In the context of the present invention, a crosslinking agent is defined to be any compound capable of generating radicals which can initiate a crosslinking reaction. Preferably, the crosslinking agent contains at least one —O—O— bond or at least one —N=N— bond. More preferably, the crosslinking agent is a peroxide known in the field.

The crosslinking agent, e.g. a peroxide, is preferably added in an amount of 0.1-3.0 wt.-%, more preferably 0.15-2.6 wt.-%, most preferably 0.2-2.2 wt.-%, based on the weight of the crosslinkable polymer composition.

As peroxides used for crosslinking, the following compounds can be mentioned: di-tert-amylperoxide, 2,5-di(tert-butylperoxy)-2,5-dimethyl-3-hexyne, 2,5-di(tert-butylperoxy)-2,5-dimethylhexane, tert-butylcumylper-oxide, di(tert-butyl)peroxide, dicumylperoxide, di(tert-butylperoxy-isopropyl)benzene, butyl-4,4-bis(tert-butylperoxy)valerate, 1,1-bis(tert-butylperoxy)-3,3,5-trimethylcyclohexane, tert-butylperoxybenzoate, diben-zoylperoxide.

Preferably, the peroxide is selected from 2,5-di(tert-butylperoxy)-2,5-dimethyl-hexane, di(tert-butylperoxy-isopropyl)benzene, dicumylperoxide, tert-butylcumylperoxide, di(tert-butyl)peroxide, or mixtures thereof. Most preferably, the peroxide is dicumylperoxide.

Preferably, the crosslinkable polymer composition further comprises a scorch retarder. In the context of the present invention, a "scorch retarder" is defined to be a compound that reduces the formation of scorch during extrusion of a polymer composition, at typical extrusion temperatures used, if compared to the same polymer composition extruded without said compound. Besides scorch retarding properties, the scorch retarder may simultaneously result in further effects like boosting, i.e. enhancing crosslinking performance during the crosslinking step.

Preferably, the scorch retarder is selected from 2,4-diphenyl-4-methyl-1-pentene, substituted or unsubstituted diphenylethylene, quinone derivatives, hydroquinone derivatives, monofunctional vinyl containing esters and ethers, or mixtures thereof. More preferably, the scorch retarder is selected from 2,4-diphenyl-4-methyl-1-pentene, substituted or unsubstituted diphenylethylene, or mixtures thereof. Most preferably, the scorch retarder is 2,4-diphenyl-4-methyl-1-pentene.

Preferably, the amount of scorch retarder is within the range of 0.005 to 1.0 wt.-%, more preferably within the range of 0.01 to 0.8 wt.-%, based on the weight of the crosslinkable polymer composition. Further preferred ranges are 0.03 to 0.75 wt-%, 0.05 to 0.70 wt-% and 0.07 to 0.50 wt-%, based on the weight of the crosslinkable polymer composition.

The polymer composition may contain further additives, such as antioxidants, stabilisers, processing aids, and/or crosslinking boosters. As antioxidant, sterically hindered or semi-hindered phenols, aromatic amines, aliphatic sterically hindered amines, organic phosphates, thio compounds, and mixtures thereof, can be mentioned. Typical crosslinking boosters may include compounds having an allyl group, e.g. triallylcyanurate, triallylisocyanurate, and di-, tri- or tetra-acrylates. As further additives, flame retardant additives, acid scavengers, inorganic fillers and voltage stabilizers can be mentioned.

If an antioxidant, optionally a mixture of two or more antioxidants, is used, the added amount can range from 0.005 to 2.5 wt-%, based on the weight of the crosslinkable polymer composition. If the polyolefin component (i) of the crosslinkable polymer composition is a polyethylene, the antioxidant(s) are preferably added in an amount of 0.005 to 0.8 wt-%, more preferably 0.01 to 0.60 wt-%, even more preferably 0.05 to 0.50 wt-%, based on the weight of the crosslinkable polymer composition. If the polyolefin component (i) is a polypropylene, the antioxidant(s) are preferably added in an amount of 0.005 to 2 wt-%, more preferably 0.01 to 1.5 wt-%, even more preferably 0.05 to 1 wt-%, based on the weight of the crosslinkable polymer composition.

In a preferred embodiment, the crosslinkable polymer composition comprises as a further additive a polypropylene glycol which is a propylene glycol polymer or propylene glycol copolymer, preferably a propylene glycol copolymer, more preferably a propylene glycol block copolymer and most preferably a propylene glycol block copolymer comprising propylene glycol and ethylene glycol. Most preferably, the propylene glycol block copolymer is of the formula

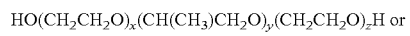

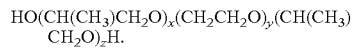

Additionally, it is preferred that the propylene glycol polymer as defined above, preferably propylene glycol block copolymer comprising ethylene glycol, has a molecular weight from 2500 to 40000 g/mol, more preferably from 2800 to 35000 g/mol, still more preferably from 3100 to 33000 g/mol and most preferably the molecular weight of the polypropylene glycol is about 10000 g/mol. Additionally, it is preferred that the amount calculated of the ethylene glycol units, in the total propylene glycol, preferably propylene glycol block copolymer comprising ethylene glycol, ranges from 40 to 60%, more preferred from 45 to 55%, more preferred from 48 to 52% and the most preferred value is about 50%.

Also a pentaerythritol can be the base for these block structures (comprising propylene glycol and ethylene glycol units) as described above.

As a further additive, the crosslinkable polymer composition preferably comprises a fatty acid ester of the general formula

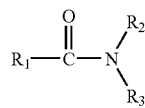

whereby $R_1$ is the residue of a fatty acid which is an aliphatic saturated hydrocarbon chain with preferably 1 to 30 carbon atoms, more preferably 1 to 20 carbon atoms. It is additionally preferred that the aliphatic saturated hydrocarbon chain is non-branched. $R_2$ and $R_3$ can be every organic residue but it is preferred that $R_2$ or $R_3$ is an aliphatic saturated hydrocarbon chain, preferably a non-branched aliphatic saturated alcohol, still more preferably a non-branched aliphatic saturated alcohol with 1 to 30 carbon atoms and most preferred $R_2$ or $R_3$ is ethanol.

Furthermore, it is preferred that $R_2$ or $R_3$ is polyoxyethylene or polyoxypropylene, most preferred polyoxyethylene or polyoxypropylene comprising 6 to 24, preferably 6 to 12 ether bonds. It is still more preferred that $R_2$ is an alcohol as defined above and $R_3$ is polyoxyethylene or polyoxypropylene as defined above.

The most preferred amido group containing fatty acid esters are polyethoxyethylene-mono-ethanolamide of alkyl fatty acids (CAS 157707-44-3) and therefrom the most preferred components are polyethoxy ethylene-monoethanol amide coconut oil fatty acids (CAS 68425-44-5).

Another preferred additive to the crosslinkable polymer composition is an ethoxylated and/or propoxylated fatty acid which is a fatty acid as defined above which comprises polyoxyethylene and/or polyoxypropylene residues as defined above on the ester group. It is preferred that ethoxylated and/or propoxylated fatty acids are oleic acid propyleneethylene adducts, more preferred with 6 to 24, preferably 6 to 12 ether bonds per chain.

A preferred ethoxylated fatty acid is an ethylene oxide condensation product of a saturated fatty acid with a density (50° C.) of approximately 1000 kg/m$^3$, melting range of 34 to 42° C. and with a viscosity (50° C.) of about 50 mPa×s (Akzo Nobel, Besal Fintex 10 as on the datasheet issued 21, Mar. 2000).

Another preferred additive is an ethoxylated and/or propoxylated pentaerythritol which can be a mixture of an ethoxylated pentaerythritol and a propoxylated pentaerythritol or can be a compound which is ethoxylated and propoxylated within the same molecule. Preferably, it is of the formula $C(CH_2O(CH_2CH_2O)_nH)_4$ whereby an n is 30 to 500, more preferably 30 to 300, more preferred 50 to 200 and most preferred 100-200. Moreover, it is preferred that the ethoxylated or propoxylated or a mix ethoxylated/propoxylated pentaerythritol component, preferably of the formula $C(CH_2O(CH_2CH_2O)_nH)_4$, has a molecular weight of 7000 to 30000 g/mol, more preferably from 18000 to 25000 g/mol and most preferred about 20000 g/mol. Moreover, it is preferred that the ethoxylated pentaerythritol component, preferably of the formula $C(CH_2O(CH_2CH_2O)_nH)_4$, has a melting point measured according ISO3016 of 50 to 70° C., more preferred of 55 to 60° C. and most preferred about 60° C. The density measured according DIN 51562 (70° C.) ranges for the ethoxylated pentaerythritol, preferably of the formula $C(CH_2O(CH_2CH_2O)_nH)_4$, preferably from 900 to 1150 g/cm$^3$, more preferably 950 to 1000 g/cm$^3$ and is most preferred about 1085 g/cm$^3$. It is additionally preferred that the melt viscosity for the ethoxylated pentaerythritol, preferably of the formula $C(CH_2O(CH_2CH_2O)_nH)_4$, measured according to DIN 51562 (70° C.) ranges preferably between 3000 to 6000 mm$^2$/s, more preferably 3500 to 5500 mm$^2$/s, most preferred 4000 to 5000 mm$^2$/s.

It is especially preferred that the ethoxylated pentaerythritol is a branched pentaerythritol based ethyleneoxide-copolymer with the formula $C(CH_2O(CH_2CH_2O)_{450}H)_y$, having a molecular weight of about 20000 g/mol, melting point (ISO3016) of about 60° C., a density at 70° C. (DIN 51562) of about 1.085 g/cm$^3$ and a melt viscosity at 70° C. (DIN 51562) of 4000-5000 mm$^2$/s (Clariant, polyglycol P10/20000 data sheet issued January 03).

Further additives may be present in an amount of 0.005 to 3 wt %, more preferably 0.005 to 2 wt %, based on the weight of the crosslinkable polymer composition. Flame retardant additives and inorganic fillers can be added in higher amounts.

From the crosslinkable polymer composition described above, a crosslinked composition can be prepared by blending with a crosslinking agent, followed by treatment under crosslinking conditions, thereby increasing the crosslinking level. Crosslinking can be effected by treatment at increased temperature, e.g. at a temperature of at least 160° C. When peroxides are used, crosslinking is generally initiated by increasing the temperature to the decomposition temperature of the corresponding peroxide. When the peroxide decomposes, radicals are generated from the peroxide. These radicals then intitiate the crosslinking reaction.

Preferably, the crosslinked polymer composition has a hot set elongation value of less than 175%, more preferably less than 100%, even more preferably less than 90%, determined according to IEC 60811-2-1. Hot set elongation values are related to the degree of crosslinking. The lower the hot set elongation value, the more crosslinked is the material.

As will be demonstrated below in the examples, the crosslinkable polymer composition of the present invention can be crosslinked—at higher crosslinking speed and results in a crosslinked polymer composition having an improved electric breakdown strength after wet ageing. The crosslinking speed is an important parameter. If the formulation has an improved crosslinking performance, this can for example be seen in that it takes a shorter time to reach a certain degree of crosslinking. If that is the case, then this could be utilised in different ways: e.g. by running the cable line at an increased line speed or a lower crosslinking temperature profile could be used in the vulcanising tube. One way of evaluating the crosslinking speed is to determine the time needed to reach for example 90% of the final torque value (M90%). The time need is referred to T90%. If the M90% torque value for the reference formulation is determined this value could be compared with the time needed for the inventive formulations to reach that M90% value of the reference material. If a formulation has a shorter T90% value than the used reference, i.e. this formulation reaches the targeted torque value after a shorter time period, demonstrates that this formulation crosslinks faster. In practice this means that this material can be run with an increased line speed on a cable line. Another way of utilizing this enhanced crosslinking performance is to reduce the amount of peroxide needed to reach a certain degree of crosslinking.

Increasing the electric field applied to an insulation system, the dielectric material will get an electrical breakdown at a certain value, the so-called breakdown strength. This involves a destructive sudden flow of current leading to a conductive path through the dielectric material, which cannot any longer support an applied voltage.

A dielectric usually is being used at nominal field well below the breakdown strength, but different kind of degradation processes (ageing), for example water treeing, may reduce the breakdown strength over time, possibly to such low levels that the system fails during service.

There are numerous ways to evaluate the resistance of the insulating material to water tree degradation. In the present invention, the method is based on model cables consisting of an inner semiconductive layer, insulation layer and an outer semiconductive layer. The insulation has a thickness of 1.5 mm. The ageing conditions are 9 kV/mm, 50 Hz, 85° C. in the water filled conductor area, 70° C. in the surrounding water, and an ageing time of 1000 h. The breakdown strength of these model cables is determined before and after ageing. As shown below in the examples, assessment of water tree retarding properties of a polymeric material can be made on the basis of electric breakdown strength measurements after ageing in water. Polymers still having high breakdown strength after ageing in water are considered to have an improved resistance to the formation of water trees.

In a preferred embodiment, the crosslinked polymer composition has an electric breakdown strength of at least 50 kV/mm after 1000 h wet ageing at the ageing conditions described in this section. More preferably, the electric breakdown strength is at least 55, at least 60, or at least 65 kV/mm. The semiconductive material used in the model cable test, both as inner and outer semicon, could be described in the following way: a poly(ethylene-co-butylacrylate) polymer with a butylacrylate content of 1300 micromoles containing 40 wt % of a conductive furnace black. The composition is stabilised with an antioxidant of the polyquinoline type and contains 1 wt % of a peroxide as a crosslinking agent.

From the crosslinkable polymer composition of the present invention, a multilayered article can be prepared wherein at least one layer comprises said polymer composition. When crosslinking is initiated, a crosslinked multilayered article is obtained. Preferably, the multilayered article (either crosslinked or not) is a cable, preferably a power cable.

In the context of the present invention, a power cable is defined to be a cable transferring energy operating at any voltage. The voltage applied to the power cable can be alternating (AC), direct (DC), or transient (impulse). In a preferred embodiment, the multilayered article is a power cable operating at voltages higher than 1 kV. In other preferred embodiments, the power cable prepared according to the present invention is operating at voltages higher than 6 kV, higher than 10 kV or higher than 33 kV.

The multilayered article can be prepared in a process wherein the crosslinkable composition of the present invention, in combination with a crosslinking agent, is applied onto a substrate by extrusion. In such an extrusion process, the sequence of mixing the components of the crosslinkable composition can be varied, as explained below. In the following examples about the blending sequence, reference is made to the polyolefin (i.e. component (i)) in general. However, the following statements are applicable to the olefin homopolymer as well as to the unsaturated polyolefin having a total amount of carbon-carbon double bonds/1000 C-atoms of at least 0.1. Furthermore, the following statements are applicable to the polar copolymer having double bonds originating from polyunsaturated comonomers as well as to polar copolymers having no or a very low amount of double bonds.

According to a preferred embodiment, the polyolefin, the polar copolymer and the glycerol ester compound are mixed with each other and with one or more antioxidants, possibly in combination with further additives, either on solid pellets or powder of the different polymer components or by melt mixing, followed by forming pellets from the melt. Subsequently, the crosslinking agent, preferably a peroxide, and optionally a scorch retarder and/or a crosslinking booster are added to the pellets or powder in a second step. Alternatively, the scorch retarder and/or crosslinking booster could already be added in the first step, together with the antioxidant(s). The final pellets are fed to the extruder, e.g. a cable extruder.

According to another preferred embodiment, instead of a two-step process, the polyolefin, the polar copolymer and the glycerol ester compound, preferably in the form of pellets or powder, the antioxidant (s) and crosslinking agent, and optionally a scorch retarder and/or further additives such as a crosslinking booster, are added to a compounding extruder, single or twin screw. Preferably, the compounding extruder is operated under careful temperature control.

According to another preferred embodiment, a mix of all components, i.e. including antioxidant (s) and crosslinking agent and optionally a scorch retarder and/or further additives such as a crosslinking booster, are added onto the pellets or powder made of the polyolefin, the polar copolymer and the glycerol ester compound.

According to another preferred embodiment, pellets made of the polyolefin, the polar copolymer and the glycerol ester compound, optionally further containing antioxidant(s) and additional additives, are prepared in a first step, e.g. by melt mixing. These pellets, obtained from the melt mixing, are then fed into the cable extruder. Subsequently, crosslinking agent and optionally a scorch retarder and/or a crosslinking booster are either fed in the hopper or directly into the cable extruder. Alternatively, crosslinking agent and/or scorch retarder and/or crosslinking booster are already added to the pellets before feeding these pellets into the cable extruder.

According to another preferred embodiment, pellets made of the polyolefin, the polar copolymer and the glycerol ester compound without any additional components are fed to the extruder. Subsequently, antioxidant(s), crosslinking agent and optionally a scorch retarder, optionally in combination with further additives such as a crosslinking booster, are either fed in the hopper or directly fed into the polymeric melt within the cable extruder. The glycerol ester compound could be added in this step instead, together with the antioxidants, crosslinking agent, scorch retarder and the other additives used. Alternatively, at least one of these components, i.e. crosslinking agent, scorch retarder, crosslinking booster, antioxidant, or a mixture of these components is already added to the pellets before feeding these pellets into the cable extruder.

According to another preferred embodiment, a highly concentrated master batch is prepared. The master batch may comprise one or more of the following components: antioxidant(s), scorch retarder and/or crosslinking booster and crosslinking agent. The glycerol ester compound can also be provided in a master batch. Furthermore, it is possible to provide each of the additives mentioned above in a separate master batch. The one or more master batches are then added to or mixed with the polyolefin, the polar copolymer and optionally the glycerol ester compound, if not already provided in a master batch. If there is any component not added through the masterbatch, that component either has to be present in the pellets or powder used from the start or it has to be added separately prior to or during the extrusion process.

When producing a power cable by extrusion, the polymer composition can be applied onto the metallic conductor and/or at least one coating layer thereof, e.g. a semiconductive layer or insulating layer. Typical extrusion conditions are mentioned in WO 93/08222.

EXAMPLES

Testing Methods/Measuring Methods (a) Determination of the Amount of Double Bonds for Polymers without Units Derived from a Polar Comonomer The procedure outlined below is used for those polyolefins, in particular unsaturated polyolefins, which have no or less than 0.4 wt % of polar comonomer units. If polar comonomer units are present, the procedure described under item (b) is used.

The procedure for the determination of the amount of double bonds/1000 C-atoms is based upon the ASTM D3124-

72 method. In that method, a detailed description for the determination of vinylidene groups/1000 C-atoms is given based on 2,3-dimethyl-1,3-butadiene. The described sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analysed by means of IR spectrometry and given as the amount of vinyl bonds, vinylidene bonds and trans-vinylene bonds, respectively.

Thin films were pressed with a thickness of 0.5-1.0 mm. The actual thickness was measured. FT-IR analysis was performed on a Perkin Elmer 2000. Four scans were recorded with a resolution of 4 cm$^{-1}$.

A base line was drawn from 980 cm$^{-1}$ to around 840 cm$^{-1}$. The peak heights were determined at around 888 cm$^{-1}$ for vinylidene, around 910 cm$^{-1}$ for vinyl and around 965 cm$^{-1}$ for trans-vinylene. The amount of double bonds/1000 carbon atoms was calculated using the following formulas:

vinylidene/1000 C-atoms=$(14 \times A)/(18.24 \times L \times D)$ vinyl/1000 C-atoms=$(14 \times A)/(13.13 \times L \times D)$ trans-vinylene/1000 C-atoms=$(14 \times A)/(15.14 \times L \times D)$ wherein
A: absorbance (peak height)
L: film thickness in mm
D: density of the material (g/cm$^3$)

(b) Determination of the Amount of Double Bonds for Polymers Having Units Derived from a Polar Comonomer and Having a Polar Comonomer Content of Higher than 0.4 wt %

The procedure corresponds to the one outlined above with the exception of base line definition. For base line definition, see Table 2. The procedure was used for the polar copolymer and for those unsaturated polyolefins having units originating from a polar comonomer in an amount of more than 0.4 wt %.

Total double bond content for the component (ii) is based on the sum of vinyl/1000 C and vinylidene/1000 C.

(c) Determination of the Vinyl Content Originating from the Polyunsaturated Compound The number of vinyl groups originating from the polyunsaturated comonomer (i.e. in this example 1,7-octadiene) per 1000 carbon atoms was determined as follows:

Polymers 1-4 have been produced on the same reactor, basically using the same conditions, i.e. similar temperature and pressure. Then, it is assumed that the base level of vinyl groups, i.e. the ones formed by the process without the addition of chain transfer agent resulting in vinyl groups, is the same for polymers 1-4. This base level is then subtracted from the measured numbers of vinyl groups in polymers 1-3, thereby resulting in the number of vinyl groups/1000 C-atoms, which result from the polyunsaturated comonomer.

All polymers were polymerised in a high pressure tubular reactor at a pressure of 1000 to 3000 bar and a temperature of 100 to 300° C. All polymers have a density within the range of 0.920-0.925 g/cm$^3$.

(d) Density Measurements

The density was determined on a pressed plaque or from a string from the MFR equipment. In case of a plaque, this was pressed at 175° C. and the cooling rate used 15° C./min. A piece was cut out from the string or from the plaque and this piece was then conditioned in boiling water for 30 minutes followed by cooling for 1 h (material still kept in the water). Then the density measurement was done in a density column. Parts of this procedure follow the ASTM D2839.

(e) Elastograph Measurements of the Degree of Crosslinking

The degree of crosslinking was determined on a Göttfert Elastograph™. The measurements were carried out using press-moulded circular plaques. First, a circular plaque was pressed at 120° C., 2 min. without pressure, followed by 2 min. at 5 tons. Then, the circular plaque was cooled to room temperature. In the Elastograph, the evolution of the torque is measured as a function of crosslinking time at 180° C. The reported torque values are those reached after 10 minutes of crosslinking at 180° C.

In the torque measurements which are carried out as explained above, the evolution of the torque as a function of time is monitored. In addition thereto, the time to reach a certain degree of cure was recorded as a way to assess the crosslinking speed properties. Here the degree of cure was chosen to be 90% of the final torque value in a reference material (here Comparative Example 1 and Comparative Example 2 respectively). This torque value is then referred to as the M90% value and the time needed to reach the respective M90% value is the so-called T90% value. The M90% cure value is determined according to the equation given below where the $M_{max}$ value is the maximum torque value reached and the $M_{min}$ is the minimum torque value in the curve. The calculation is done according to the following equation:

$M$90% cure=$M_{min}$+0.90($M_{max}$-$M_{min}$)

This M90% cure value was calculated for Comparative formulation 1 and Comparative formulation 2, see the Examples part. From this M90% cure value the T90% is calculated. The shorter the time needed to reach the M90% for the respective Comparative formulation the higher the crosslinking speed.

(f) Measurement of Hot Set and Permanent Deformation

Hot set elongation and permanent deformation are determined on crosslinked plaques. These plaques are prepared as follows: First, the pellets were melted at 115° C. at around 10 bar for 2 minutes. Then the pressure was increased to 200 bar, followed by ramping the temperature up to 165° C. The material was kept at 165° C. for 25 minutes and after that it was cooled down to room temperature at a cooling rate of 15° C./min. The thickness of the plaque was around 1.8 mm.

The hot set elongation as well as the permanent deformation were determined on samples taken from the crosslinked plaques. These properties were determined according to IEC 60811-2-1. In the hot set test, a dumbbell of the tested material is equipped with a weight corresponding to 20 N/cm$^2$. This specimen is put into an oven at 200° C. and after 15 minutes, the elongation is measured. Subsequently, the weight is removed and the sample is allowed to relax for 5 minutes. Then, the sample is taken out from the oven and is cooled down to room temperature. The permanent deformation is determined.

(g) Melt Flow Rate

The melt flow rate is equivalent to the term "melt index" and is determined according to ISO 1133 and is indicated in g/10 min. Melt flow rate is determined at different loadings, such as 2.16 kg (MFR$_2$). Melt flow rate is determined at a temperature of 190° C.

(h) Wet Ageing Test

The wet ageing test is based on a procedure described in an article by Land H. G. and Schädlich H., "Model Cable Test for Evaluating the Ageing Behaviour under Water Influence of Compounds for Medium Voltage Cables", Conference Proceedings of Jicable 91, Jun. 24 to 28, 1991, Versaille, France.

The wet ageing properties were evaluated on (model cables) minicables. These cables consist of a Cu wire onto which an inner semiconductive layer, an insulation layer and an outer semiconductive layer are applied. The model cable has the following construction: inner semiconductive layer of 0.7 mm, insulation layer of 1.5 mm and outer semiconductive layer of 0.15 mm. The cables are extruded and vulcanised, i.e. the material is crosslinked. After this the model cables are preconditioned at 80° C. for 72 h.

The Cu wire is removed and then replaced by a thinner Cu wire. The cables are put into water bath to be aged for 1000 h under electric stress and at a temperature of 70° C. of the surrounding water and at a temperature of the water in the conductor area of 85° C. The initial breakdown strength as well as the breakdown strength after 1000 h wet ageing are determined.

The cables are prepared and aged as described below.
Preconditioning: 80° C., 72 h
Applied voltage: 9 kV/50 Hz
Electric stress (max.): 9 kV/mm
Electric stress (mean): 6 kV/mm
Conductor temperature: 85° C.
Water bath temperature: 70° C.
Ageing time: 1000 h
Deionized water in conductor and outside: if not otherwise stated Five specimens with 0.50 m active length from each cable were aged.

The specimens were subjected to ac breakdown tests (voltage ramp: 100 kV/min.) and the Weibull 63.2% values of the breakdown strength (field stress at the inner semiconductive layer) are determined before and after ageing.

(i) Measurement of Extrusion Properties

The two compounds used for the extrusion tests were prepared by melt blending the ingredients on a PRISM extruder. These pellets were then fed into the extruder used for the extrusion performance tests.

The extrusion tests were made on a Maillefer 60 mm (24 D) extruder. The screw type used is of a conventional type used for peroxide crosslinkable compounds. The temperature settings are 110, 115, 120, 120, 125, 125, 125° C. The out put (kg/h), melt temperature and melt pressure were determined at 20, 35, 50 and 70 rpm. The melt pressure was recorded by a conventional device for measurement of the melt pressure of a polymer melt within an extruder. The melt temperature was measured by hand with a thermocouple instrument. This device was put directly in the melt coming out from the extruder head. The reported value is the average of two measurements. The out put was measured by extruding the polymer melt coming out from the extruder on a pre-weighed plate for a certain period of time. The weight of the plastic coming out during this certain period was weighed and the out put in kg/h was calculated. The reported value is the average of two measurements.

Polymers

Polyolefin Component (i)

Polymers 1-3 are poly(ethylene-co-1,7-octadiene) polymers containing different levels of 1,7-octadiene.

Polymer 4 is an ethylene homopolymer.

Polar Copolymer Component (ii)

Polymer 5 is a poly(ethylene-co-butylacrylate) polymer, i.e. a polar copolymer prepared by copolymerisation of ethylene with the polar comonomer butyl-acrylate.

Polymer 6 is a polar ethylene terpolymer that contains ethylene, 1,7-octadiene and butylacrylate.

Further information about polymers 1-6 is provided in tables 1 and 2.

TABLE 1

Amount and type of double bonds in polymers 1-4

| Sample | $MFR_{2.16}$, 190° C. (g/10 min) | Total amount of double bonds/1000 C | Total amount vinyl/1000 C | Vinyl from diene/1000 C | Vinylidene/1000 C | Trans-vinylene/1000 C |
|---|---|---|---|---|---|---|
| Polymer 1 | 2.7 | 1.17 | 0.82 | 0.71 | 0.24 | 0.11 |
| Polymer 2 | 2.0 | 0.53 | 0.26 | 0.15 | 0.21 | 0.06 |
| Polymer 3 | 2.0 | 0.60 | 0.31 | 0.2 | 0.23 | 0.06 |
| Polymer 4 | 2.0 | 0.37 | 0.11 | — | 0.22 | 0.04 |

TABLE 2

Characteristics of the polar ethylene copolymers, Polymers 5-6

| Sample | $MFR_{2.16/190° C.}$, g/10 min | Acrylate Type | Acrylate content (wt %) | Vinyl/1000 C | Vinyl/1000 C from diene | Vinylidene/1000 C | Total amount of double bonds/1000 C |
|---|---|---|---|---|---|---|---|
| Polymer 5 | ≈4 | butyl-acrylate | ≈21 | 0[a] | — | 0.18[a] | 0.18 |
| Polymer 6 | ≈7.2 | butyl-acrylate | ≈16.8 | 0.41[b] | 0.31 | 0.16[b] | 0.57 |

[a]base line between 918 to 868 cm$^{-1}$
[b]base line between 919 to 868 cm$^{-1}$ As explained above, the total amount of double bonds of the polar copolymer is based on the amount of vinyl groups and the amount of vinylidene groups.

Using the polymers described above, formulations are prepared. Further details about the formulations are provided in Table 3.

The amount of polar comonomer units within the polymer composition is calculated as explained below by making reference to the following example:

1 g formulation contains 23 wt-% of the polar ethylene copolymer. The polar ethylene copolymer contains 17 wt-% polar comonomer units. The molecular weight of the polar comonomer unit used ($M_{polar\ comonomer\ unit}$) has to be introduced, for example 86 g/mole for methylacrylate, and 128 g/mole for butylacrylate.

$$\frac{(1 \times 0.23 \times 0.17)}{128} = 305 \times 10^{-6} \text{moles (or 305 micromoles)}$$

TABLE 3

Formulations for crosslinking experiments and crosslinking data

| Sample | Component (i) | Component (ii) and its amount per g crosslinkable polymer composition | AO cont. (%) | Component (iii) glycerol ester comp. (wt %) | Crosslinking agent (%) |
|---|---|---|---|---|---|
| Inventive form. 1 | Polymer 1 | Butyl-acrylate, 328 micromole | 0.2 | 0.2 | 1.9 |
| Inventive form. 2 | Polymer 2 | Butyl-acrylate, 328 micromole | 0.2 | 0.2 | 1.9 |
| Inventive form. 3 | Polymer 4 | Butyl-acrylate, 328 micromale | 0.2 | 0.2 | 1.9 |

TABLE 4

Formulations used for the wet ageing tests.

| Sample | Component (i) | Polar copolymer, type and content in micromole per g crosslinkable polymer composition | Amount of glycerol ester comp. (wt %) | AO content (%) | Crosslinking agent (%) | Scorch retarder (%) |
|---|---|---|---|---|---|---|
| Inventive form. 4 | Polymer 4 | Polymer 5 164 micromole | 0.2 | ≈0.2% | 1.82% | 0.45% |
| Comp. example 1 | Polymer 4 | Polymer 5 164 micromole | — | ≈0.2% | 1.82% | 0.45% |
| Inventive form. 5 | Polymer 4 | Polymer 5 328 micromole | 0.2 | ≈0.2% | 1.85% | 0.35% |
| Inventive form. 6 | Polymer 3 | Polymer 6 305 micromole | 0.2 | ≈0.2% | 1.85% | 0.35% |
| Comp. example 2 | Polymer 3 | Polymer 6 305 micromole | — | ≈0.2% | 1.85% | 0.35% |

Antioxidant (AO) is 4,4'-thiobis (2-tert-butyl-5-methylphenol) (CAS number 96-69-5).

Crosslinking agent is dicumylperoxide (CAS number 80-43-3).

Scorch retarder is 2,4-diphenyl-4-methyl-1-pentene (CAS number 6362-80-7).

Additive is polyglycerolester (CAS number 68953-55-9).

TABLE 5a

Summary of the calculated content of double bonds/1000 C in some of the blend compositions used.

| Sample | Component (i) | Component (ii) | Calculated double bond content/1000 C |
|---|---|---|---|
| Inventive formulation 1 | Polymer 1 (79.6%) | Polymer 5 (20%) | 0.967 |
| Inventive formulation 2 | Polymer 2 (79.6%) | Polymer 5 (20%) | 0.458 |
| Inventive formulation 3 | Polymer 4 (79.6%) | Polymer 5 (20%) | 0.331 |
| Inventive formulation 6 | Polymer 3 (76.6%) | Polymer 6 (23%) | 0.591 |
| Comparative formulation 2 | Polymer 3 (76.8%) | Polymer 6 (23%) | 0.592 |

Total double bond content in Component (i) is based on vinyl, vinylidene and trans-vinylene as described earlier.
Total double bond content in Component (ii) is based on vinyl and vinylidene as described earlier.
Calculation based on the formulation containing antioxidant and component (iii), if present.

TABLE 5b

Summary of the calculated content of vinyl groups/1000 C in some of the blend compositions used.

| Sample | Component (i) | Component (ii) | Calculated vinyl group content/1000 C |
|---|---|---|---|
| Inventive formulation 1 | Polymer 1 (79.6%) | Polymer 5 (20%) | 0.653 |
| Inventive formulation 2 | Polymer 2 (79.6%) | Polymer 5 (20%) | 0.207 |
| Inventive formulation 3 | Polymer 4 (79.6%) | Polymer 5 (20%) | 0.088 |
| Inventive formulation 6 | Polymer 3 (76.6%) | Polymer 6 (23%) | 0.332 |
| Comparative formulation 2 | Polymer 3 (76.8%) | Polymer 6 (23%) | 0.332 |

These calculations are based on the total amount of vinyl in component (i) and the total content of vinyl in component (ii).

TABLE 6

Crosslinking data and cure speed data.

| Sample | Elastograph value (Nm) | Time to torque corresponding to T90% in reference (s) | Hot set elongation (%) | Permanent deformation (%) |
|---|---|---|---|---|
| Inventive formulation 1 | 0.79 | 84* | 22.9 | 0.4 |
| Inventive formulation 2 | 0.61 | 144* | 60.1 | 1.2 |
| Inventive formulation 3 | 0.51 | 239* | 87.7 | 2.8 |

*time to reach 0.45 Nm which is the M90% value in inventive formulation 3. Inventive formulation 1 and 2 are compared with Inventive formulation 3 to have a comparison with a formulation having a lower content of double bonds and vinyl groups.

As can be seen from the examples, the formulations with an increased level of double bonds and vinyl groups reached lower hot set elongation values, lower values on the permanent deformation and higher torque values. All this indicates that these materials are more crosslinked. The Inventive formulations 1 and 2, when compared with Inventive formulation 3 (which has the lowest content of double bonds and vinyl groups), also have shorter T90% values. This shows that these formulations (with a higher double bond and vinyl content) crosslink with a higher crosslinking speed compared with the compound having a lower amount of double bonds and vinyl groups.

TABLE 7

Summary of the wet ageing results.

| Sample | $Eb_{63\%}$ (0 h) (kV/mm) | $Eb_{63\%}$ (1000 h) (kV/mm) |
|---|---|---|
| Inventive formulation 4 | 91.3 | 71.2 |
| Comparative example 1 | >90.6 | 39.9 |
| Inventive formulation 5 | 82.3 | 84.1 |
| Inventive formulation 6 | 89.6 | 80.5 |
| Comparative example 2 | >88.5 | 47.3 |

The results of table 7 clearly indicate that electric breakdown strength after wet ageing is significantly improved when using a combination of polyolefin, polar copolymer and glycerol ester compound.

TABLE 8

Data on formulations used in the out put tests.

| Sample | Component (i) | Component (ii), Polar copolymer, type and amount per gram of crosslinkable polymer composition | Component (iii), Glycerol ester compound (wt %) |
|---|---|---|---|
| Inventive formulation 7 | Polymer 4 | Butylacrylate, 328 micromole | 0.2 |
| Comparative example 3 | Polymer 4 | Butylacrylate, 328 micromole | — |

Both formulations to be compared with each other did not include a crosslinking agent.

TABLE 9

Melt pressure

| Sample | Inv. Form. 7 (bar) | Comp. example 3 (bar) |
|---|---|---|
| 20 rpm | 85 | 90 |
| 35 rpm | 100 | 107 |
| 50 rpm | 112 | 120 |
| 70 rpm | 125 | 130 |

TABLE 10

Melt temperature

| Sample | Inv. Form. 7 (° C.) | Comp. example 3 (° C.) |
|---|---|---|
| 20 rpm | 131.9 | 134.1 |
| 35 rpm | 140.9 | 142 |
| 50 rpm | 149.9 | 147.5 |
| 70 rpm | 153.5 | 156.1 |

TABLE 11

| Sample | Inv. Form. 7 (kg/h) | Comp. example 3 (kg/h) |
|---|---|---|
| 20 rpm | 19.02 | 19.28 |
| 35 rpm | 34.46 | 34.82 |
| 50 rpm | 51.27 | 51.77 |
| 70 rpm | 73.11 | 73.49 |

As can be seen in Table 11 the Inventive formulation and the comparative example gives the same out put at the rpm's investigated. Improved processing characteristics can for example be seen in the melt temperature reached and the melt pressure reached at a certain rpm or at a certain given out put. As the two formulations give the same out put we will only compare the performance at a certain rpm. If the melt pressure or melt temperature reached at a certain rpm or out put is lower this means that since there is normally peroxide present in the formulation the risk for pre-curing, scorch, is reduced if a material could be extruded at the same out put but reaching for example a lower melt temperature. This shows that the Inventive formulation 7 has improved processing properties without sacrificing the out put.

The invention claimed is:

1. A crosslinkable polymer composition, comprising
   (i) a polyolefin, having an amount of units from polar comonomer of less than 150 micromoles per gram of polyolefin,
   (ii) a polar copolymer having an amount of units from polar comonomer of more than 500 micromoles per gram of polar copolymers,
   (iii) a glycerol ester compound; and
   (iv) a crosslinking agent.

2. The polymer composition according to claim 1, wherein the polyolefin is an olefin homo- or copolymer.

3. The polymer composition according to claim 1, wherein the polyolefin is polyethylene.

4. The polymer composition according to claim 1, the polyolefin further comprising units derived from a polar comonomer selected from acrylates, methacrylates, vinyl acetate, or mixtures therefrom.

5. The polymer composition according to claim 1, wherein the polyolefin is an unsaturated polyolefin having a total amount of carbon-carbon double bonds/1000 carbon atoms of at least 0.1 based upon ASTM D 3124-72, wherein the base line is drawn from 980 cm$^{-1}$ to around 840 cm$^{-1}$ and the peak heights are determined at around 888 cm$^{-1}$ for vinylidene, around 910 cm$^{-1}$ for vinyl and around 965 cm$^{-1}$ for transvinylene.

6. The polymer composition according to claim 5, wherein the unsaturated polyolefin has a total amount of carbon-carbon double bonds/1000 carbon atoms of more than 0.37 based upon ASTMD 3124-72, wherein the base line is drawn from 980 cm$^{-1}$ to around 840 cm$^{-1}$ and the peak heights are determined at around 888 cm$^{-1}$ for vinylidene, around 910 cm$^{-1}$ for vinyl and around 965 cm$^{-1}$ for trans-vinylene.

7. The polymer composition according to claim 5, wherein at least some of the carbon-carbon double bonds are vinyl groups.

8. The polymer composition according to claim 7, wherein the unsaturated polyolefin has a total amount of vinyl groups/1000 carbon atoms of at least 0.04, based upon ASTMD 3124-72, wherein the base line is drawn from 980 cm$^{-1}$ to around 840 cm$^{-1}$ and the peak height is determined at around 910 cm$^{-1}$ for vinyl.

9. The polymer composition according to claim 5, wherein the unsaturated polyolefin is prepared by copolymerizing an olefin monomer and at least one polyunsaturated comonomer.

10. The polymer composition according to claim 9, wherein the unsaturated polyolefin has an amount of vinyl groups/1000 carbon atoms which originate from the polyunsaturated comonomer, of at least 0.03 based upon ASTMD 3124-72, wherein the base line is drawn from 980 cm$^{-1}$ to around 840 cm$^{-1}$ and the peak height is determined at around 910 cm$^{-1}$ for vinyl.

11. The polymer composition according to claim 9, wherein at least one polyunsaturated comonomer is a diene.

12. The polymer composition according to claim 11, wherein the diene is selected from 1,7-octadiene, 1,9-decadiene, 1,11-dodecadiene, 1,13tetradecadiene, 7-methyl-1,6-octadiene, 9-methyl-1,8-decadiene, or mixtures thereof.

13. The polymer composition according to claim 12, the polar copolymer further comprising units derived from a C$_3$ to C$_{20}$ alpha-olefin comonomer.

14. The polymer composition according to claim 3, wherein the polyethylene is produced by high pressure radical polymerization.

15. The polymer composition according to claim 14, the polyethylene further comprising units derived from C$_3$-C$_{20}$ alpha-olefin comonomers.

16. The polymer composition according to claim 1, the glycerol ester compound having the following formula:

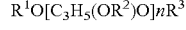

wherein n>1,
R$_1$, R$_2$ and R$_3$, which can be the same or different, are hydrogen or the residue of a carboxylic acid, with the proviso that there are at least two free OH groups and at least one residue of a carboxylic acid in the glycerol ester compound.

17. The polymer composition according to claim 16, wherein the carboxylic acid residue has from 8 to 24 carbon atoms.

18. The polymer composition according to claim 1, wherein the polar copolymer is prepared by copolymerizing an olefin monomer and a polar comonomer.

19. The polymer composition according to claim 18, wherein the olefin monomer is selected from ethylene, C$_3$-C$_{20}$ alpha-olefins, and mixtures thereof.

20. The polymer composition according to claim 18, wherein the polar comonomer is selected from acrylates, methacrylates, vinyl acetate, and mixtures thereof.

21. The polymer composition according to claim 18, the polar copolymer further comprising units derived from a polyunsaturated comonomer.

22. The polymer composition according to claim 1, further comprising a polyethylene glycol having a number average molecular weight in the range of 1,000 to 50,000.

23. The polymer composition according to claim 1, further comprising an additive having at least one ether and/or ester group, the additive being selected from polypropylene glycols, amido group containing fatty acid esters, ethoxylated and/or propoxylated pentaerythritol, ethoxylated and/or propoxylated fatty acids, alphatocopherol esters, or mixtures thereof.

24. The polymer composition according to claim 1, wherein the polyolefin is an unsaturated polyolefin having a total amount of carbon-carbon double bonds/1000 carbon atoms of more than 0.05 based upon ASTMD 3124-72, wherein the base line is drawn from 980 cm$^{-1}$ to around 840 cm$^{-1}$ and the peak heights are determined at around 888 cm$^{-1}$ for vinylidene, around 910 cm$^{-1}$ for vinyl and around 965 cm$^{-1}$ for transvinylene.

25. The polymer composition according to claim 1, having a total amount of units within the polar copolymer and optionally the polyolefin which are derived from the polar comonomer, of 100 to 800 micromoles per gram of the crosslinkable polymer composition.

26. A crosslinked polymer composition, obtained by treatment of the crosslinkable polymer composition according to claim 1, under crosslinking conditions.

27. The crosslinked polymer composition according to claim 26, having a hot set elongation value of less than 175%, determined according to IEC 60811-2-1.

28. The crosslinked polymer composition according to claim 26, having an electric breakdown strength of at least 50 kV/mm after 1000 h wet ageing at a water bath temperature of 70° C. and a conductor temperature of 85° C. and an electric stress of 9 kV/mm.

29. A process for preparing a crosslinked polymer composition, wherein the crosslinkable polymer composition according to claim 1 is treated under crosslinking conditions.

* * * * *